United States Patent

Papesh et al.

[15] 3,649,143
[45] Mar. 14, 1972

[54] COMPOSITE TUBULAR FILM APPARATUS

[72] Inventors: Edward G. Papesh, Palmer; Edward F. Papesh, Wilbraham, both of Mass.

[73] Assignee: Pierson Industries, Inc., Boston, Mass.

[22] Filed: May 1, 1969

[21] Appl. No.: 820,946

[52] U.S. Cl. .............................. 425/114, 425/131, 425/204, 156/500
[51] Int. Cl. ........................................................ B29d 23/04
[58] Field of Search .................. 18/14 S, 13 P, 14 P; 264/95

[56] References Cited

UNITED STATES PATENTS

| | | | |
|---|---|---|---|
| 2,770,009 | 11/1956 | Rogol et al. | 18/149 |
| 2,926,384 | 3/1960 | Hertz et al. | 18/147 |
| 3,161,942 | 12/1964 | Cheney | 29/2.12 |
| 3,179,978 | 4/1965 | Bergevin | 18/14 S |
| 3,210,803 | 10/1965 | Najar | 18/14 S |
| 3,238,564 | 3/1966 | Fry | 18/14 S |
| 3,355,770 | 12/1967 | Augustin | 18/14 S |
| 2,947,031 | 8/1960 | Chow et al. | 264/95 |
| 3,275,725 | 9/1966 | Utz | 18/14 P X |
| 3,314,108 | 4/1967 | Wienand et al. | 18/14 P X |
| 3,354,506 | 11/1967 | Raley | 18/13 P X |

*Primary Examiner*—William S. Lawson
*Attorney*—Chapin, Neal & Dempsey

[57] ABSTRACT

Blown tubular die apparatus for extruding laminated film. Die holder and head relatively rotatively engaging at a transverse interface. Manifold connectible to different extruder supplies and for selective ordering of the lamination materials.

Nested mandrels providing spiral homogenizing chambers exiting to a common, internal extrusion orifice. Means for relatively rotating the die head and holder, for centering the mandrels, and for sizing the extrusion.

30 Claims, 10 Drawing Figures

Inventors
Edward G. Papesh
Edward F. Papesh

By: Chittick, Pfund, Birch, Samuels & Gauthier Attys

Patented March 14, 1972 3,649,143

Inventors
Edward G. Papesh
Edward F. Papesh
by Chittick, Pfund, Birch, Samuels & Gauthier
Attys

COMPOSITE TUBULAR FILM APPARATUS

This application is a continuation-in-part of application / Ser. No. 730,505, filed May 20, 1968.

BACKGROUND OF THE INVENTION

This invention relates to blown film production, and more particularly to tubular film process and apparatus, wherein from molten thermoplastic material, or plastic, is extruded or die formed a tubular film which is drawn out over and expanded by a volume of compressed air, which is contained within an appropriate length of the tubing by the flatting of the tube for windup on supply rolls. In this blown or tubular process the size of the tube, or width of the ultimate wound roll, is controlled by admitting or extracting air to raise or lower the pressure by which the air bubble expands the plastic, before it is chilled or cooled from the molten to the solid state; and the wall or gauge of the tube is drawn down or attenuated from the die opening to the desired thickness by control of the surface speed of the tube flatting or nip rolls relative to the rate at which the thermoplastic material is extruded through the die.

This invention is concerned more particularly with the production of multi-wall or laminated film, and still more particularly with film laminated from unlike or dissimilar materials, known as composite film.

The laminating of films by the blown film process here concerned is distinguished from the mechanical laminations, such as variously known as adhesive lamination, wet lamination, heat lamination, extrusion coating, or hot melt.

Whereas in the mechanical laminations two or more operations (or a number of steps in one operation) are required, in the blown film process the dissimilar materials are combined simultaneously, by extrusion through a common die.

The structuring of the multilayered composite by blown film extrusion as here concerned brings the two or more layers of thermoplastic materials or polymers into contact while still in an amorphous or semi-molten state, and yields an intimately layered composite which to the eye is indistinguishable from monofilm. The composite film layers are thus bonded together without adhesive and at less cost than a mechanical laminate of a plurality of film layers.

By the use of the multilayered extrusion there is also obtained far greater control of the film, and adaptability of it to different end uses, such as in packaging. The greater control and adaptability is obtained by determination of the thickness and location (outer, intermediate, inner) of, and as well by the selection of the material for, the two or more film layers, or plies.

Thus, and for example, a three layered construction may typically comprise inner and outer laminations of polyethylene, and an intermediate or liner film or ply of a more costly, or exotic nature (nylon, saran, polypropylene, ionomers, EVA, H.D.P.E., polyester, rubber modifieds, etc.) This combining of different materials will be understood to supply one or another property wanted for the composite, such as gas barrier, puncture resistance, deep-draw flex, etc.

An important advantage of the blown film composite just described is the elimination of the need for shifting resins from one extruder to the other, in going from the laminate on the extreme inside to that on the extreme outside.

The advantages of the blown film method over the mechanical methods of producing composite multilayer structures, more generally comprise, among others, simplicity and economy equipment; flexibility of gauge and width; the capability of uniting resins that can be effectively combined only in the molten state; and the complete elimination of any oxidation taking place between film surfaces.

The blown film method here concerned will be understood to afford a tubular structure, or any combination thereof such as sheeting, U-film, J-film, or center fold, which cannot be achieved by mechanical process.

The blown laminating film process here concerned affords more particularly the extrusion of free films which cannot be achieved effectively by free blown method. Thus in the blown laminating film process a support tubing type material can be added, satisfactorily, as a lining type material, such as for example cellulose acetate, and others.

Among still other advantages of the blown film process there are herein to be mentioned the far greater manufacturing flexibility as to film gauges and widths, and correspondingly greater adaptability to changes in customer requirements in those regards.

Still further advantages known to be derived from the blown film process are the enhancement of the film properties, as by the molecular orientation in both the machine and the transverse directions, and by the control of the melt temperature for, and the elimination of pin holes oxidation, and other defects in, the film forming.

With respect to the orienting, for improved optical and other film properties, it is to be noted that the biaxial orienting herein obtained is not achievable with mechanical laminating, except by an impractical second process. Also that in the blown extrusion process all the film layers are biaxially oriented, whereas in the mechanical process only the substrate may be so oriented, and that, as just mentioned, only by an uneconomic second stage, and with the coating layer left unoriented.

The blown film process hereof will also be understood to afford the imparting of the biaxial orientation to, and thereby to bring out desired properties in, each layer of the composite film, thus yielding a combined or laminated film product far superior to that of the non-orienting or merely linearly orienting mechanical processes.

The method and apparatus of this invention will be clearly understood from the instant description taken together with the accompanying drawings showing one preferred form of the invention apparatus and wherein.

The invention provides for the laminating of a multi-(two, three, four, etc.) ply film, from plural (two, three, etc.) dissimilar thermoplastic or plastic resin materials, and with, in an exemplary three-ply construction, the plies of one of the materials disposed inside, or outside, or both, the ply of the other of the materials.

To that end the invention die assembly is in the illustrated embodiment adapted to receive first and second extruders 20, 22 mounted on lateral wheel and track means 21, 23 whereby they may be manually moved by the operator radially into and out of engagement with the die assembly, thus freeing that for repair or replacement.

The die assembly comprises a stand 24 mounted on wheels 25 whereby the stand and the die head supported thereon may be manually withdrawn or rolled from beneath the below-mentioned tower structure, for more convenient access to the parts.

Figure 1:
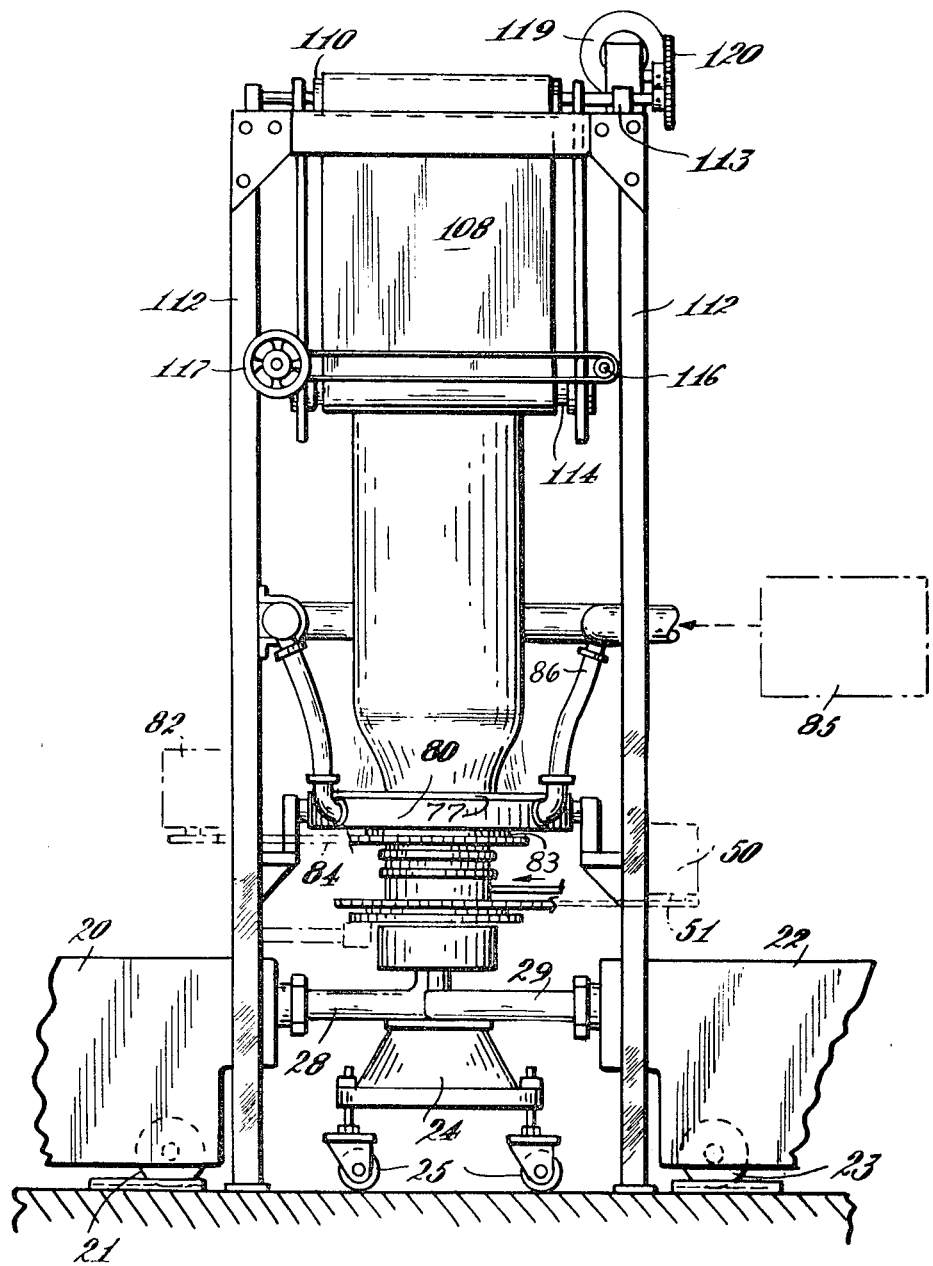
FIG. 1 is an assembly view in elevation of the blown film extrusion apparatus.
Figure 2:
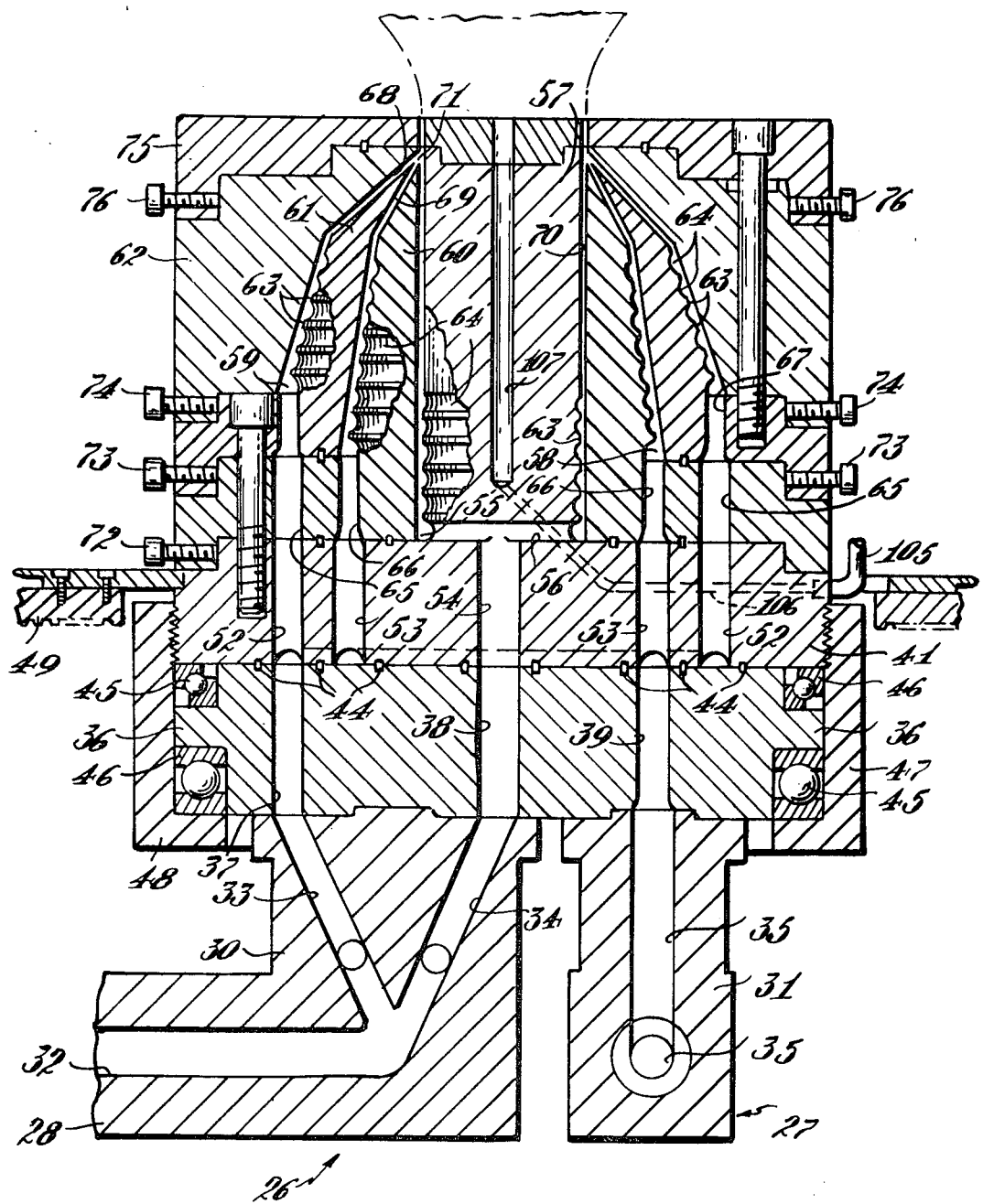
FIG. 2 is a vertical section of the die, adapter and rotator assembly.

The stand 24 mounts a pair of adapters or elbows 26, 27 FIG. 2, comprising the immediate die support, and which may be coupled to the extruder nozzles in conventional manner, as shown, FIG. 1.

The adapters or elbows 26, 27 are provided for that purposes with horizontal legs 28, 29, FIG. 1, extending to clear the stand 24 and so to engage the aforementioned extruder nozzles. The elbows 26, 27 comprise further the right angularly extending or upstanding nipples 30, 31, FIG. 2, on whose end faces the die assembly is rested.

The adapter fitting or elbow 26 is formed in the horizontal leg 28 with a port 32 providing a flow passage from the primary extruder nozzle, and which divides at the elbow into outer and inner channels 33, 34 for conducting the molten material to the outer and inner ply forming portions of the die, in the three-ply embodiment herein shown.

The other adapter 27 has a single port or passage 35 for communicating with the secondary extruder nozzle through leg 29, and for carrying the plastic material upwardly through the nipple 31 to the intermediate ply forming portion of the die.

The die assembly hereof comprises an annular base plate or die holder 36 having formed therein vertical through passages 37, 38 communicating with adapted 26 passages 33, 34, and a like vertical through passage or channel 39 communicating with passage 35 of adapter 27.

Figure 3:
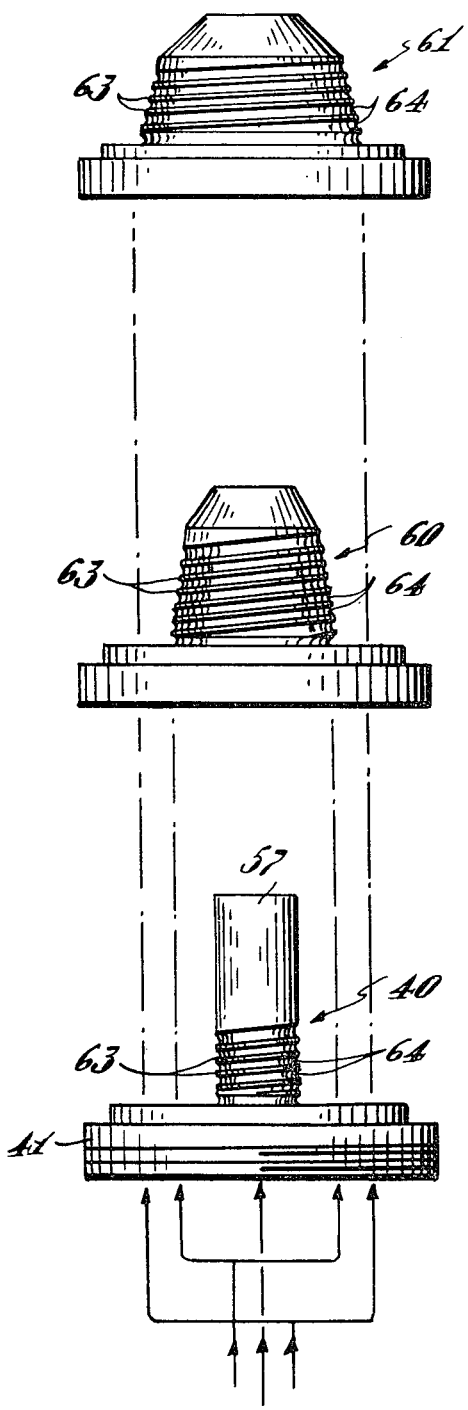
FIG. 3 is an exploded view in side elevation of the concentrically nested mandrel elements of the die head of FIG. 1, and wherein communicating flow passages are shown by the arrows and dash lines.
Figure 4:
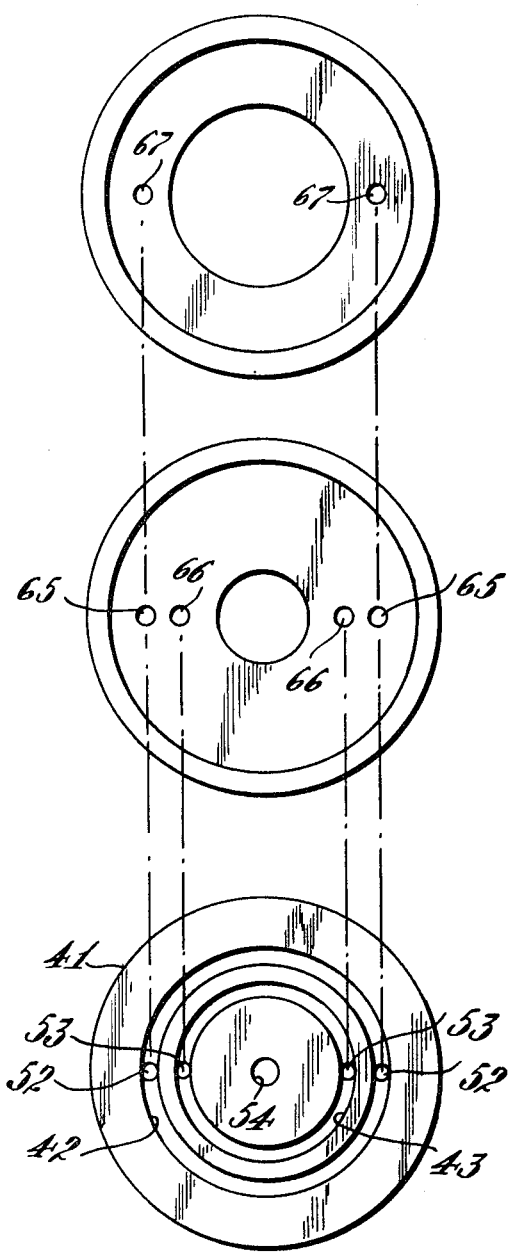
FIG. 4 shows the FIG. 3 elements in bottom plan, and with their communicating ports connected by dash lines.

The die head proper comprises a series of nested concentric ring mandrels as separately shown in FIGS. 3 and 4, of which the lowermost mandrel 40 is seated at its base plate 41 on the upper face of the die holder plate or ring 36.

As well understood in the art, the blown film is desired to be devoid of pin holes, die scratches, weld marks and the like, and to achieve the maximum uniformity of gauge. With conventional die constructions imperfections in or dirtying of the die, nonuniform flowing and uniting of the thermoplastic material, and other operating problems are found to commonly yield the above-mentioned defects, including excessive gauge deviations, or high and low spots, which build up excessive unevenness in the wound roll.

The prior attempts to solve these problems, which have been made only with respect o monofilm apparatus, and which have sought variously to employ rotation of the tower, the extruder, or the die, have offered no solution applicable to a multilayer composite film die. For the rotation of the die of a monofilm apparatus requires only the rotating of a central feed passage upon itself. Thus it has not heretofore been considered possible to provide for rotation of the non-centered multiple distribution reservoirs of a laminated film die.

The problem is uniquely solved under this invention by the provision of a rotating die, for the production of laminated film, and whereby the incipient imperfections in the tubing wall are circumferentially distributed and thereby substantially eliminated. The laminated film product of the invention is thus distinguished as substantially uniform and free from weld marks, pin holes, and other defects.

The conventional multi-ply or laminated film dies are characterized by lateral feed to the intermediate or outer ply, through side ports to the sizing ring for that ply, and with the requirement that the plastic must travel all the way around the circumference of the ring from a single inlet thereto.

Whereas it would not be possible with the prior art dies, under this invention- as just explained- there is provided novelly a bottom feed to all layers of the composite film, whereby are afforded central feed ports or passages to all film plies, which permit the desired rotation of the laminated film die here concerned.

The lowermost die mandrel 40 accordingly is formed on the underface of its bottom plate portion 41 with annular distributing reservoirs 42, 43, FIG. 4, formed by smoothly contoured or round recesses that are closed by engagement against the opposing face of die holder 36, which engagement is made resin-tight by annular seals 44 located at both sides of both reservoirs. the seals 44 are of a critical design to withstand up to 250,000 pounds back pressure.

The mandrel plate 41, and the die head parts carried thereon, are supported for rotation relative to the die holder 36 upon ball bearings 45 turning in races 46 received in recesses provided therefor in the die holder 36 and retained therein by a sleeve 47 threaded onto the plate 41 and having an inturned lip 48 closing under the lower bearing race.

For rotation of the die head the mandrel plate 41 mounts also a surrounding hollow sprocket 49, FIGS. 1 and 2, which may be driven by a suitable motor 50 through a chain 51, FIG. 1, at such rate as may be desired.

The mandrel plate 41 is provided further with vertical through ports or passages 52, 53 communicating through the reservoirs 42, 43, in all angular positions of rotation, with die holder channels 37, 39 feeding the resin for the outer and intermediate plies.

The lowermost mandrel 40, thus formed as a distributor ring for the plastic for the outer and intermediate plies, further has a central port 54 communicating with the die holder channel 38 carrying the plastic for the inner ply, and which feeds the plastic therefrom upwardly to the die chamber 55 for the inner ply, to which the plastic is admitted by a horizontal passage 56 communicating with the central ring passage 54 and opening at its opposite ends through the base of the inner mandrel stem 57.

Under this invention the blown tubular film laminae or plies are independently formed within the die head in separate, concentric die chambers 55, 58 59 defined by the juxtaposed outer and inner stem faces of the concentric inner, intermediate and outer mandrels 40, 60, 61, and by the enclosing of the outer mandrel 61 by a ring 62 interiorly formed similarly as the intermediate and outer mandrels 60, 61 to closely and conformantly enclose the mandrel stem face juxtaposed thereto.

In accordance with the invention the plastic material, which is uniformly distributed and equally travelled in its course to the die chambers, is further conditioned in said chambers to eliminate weld marks, to achieve better homogenization, and to minimize gauge deviations. This is accomplished through the use of a novel spiral die construction for the die chambers 55, 58, 59 and the lands 63 and grooves 64.

The die chamber spirals are of uniform pitch, but in vertical progression are of increasingly shallow depths in their grooves 64, and of increasingly wider crests in their lands 63. The spirals further have a two-fluted or double thread arrangement, such that the spiral pitch, which may be ⅝ inch actual, is by the double entry made in that case a 1¼ inches pitch.

Referring to FIG. 2, the outside diameter of the lands 63 will be seen also to progressively vertically decrease relative to the inside diameter of the juxtaposed mandrel stem inner face. The depth of the land intervening grooves 64 also decreases, progressively from the bottom towards the top of the die chambers 55, 58, 59. As a result the molten plastic material, which upon being homogenized, or broken down by its circumferential travel through the spirals under the back pressure thereof, is made increasingly to flow over the spirals, thereby insuring the avoidance of stagnation of the plastic, and ordering the expelling of it in a smooth tubular film from the die chambers.

For conducting the plastic to the die chambers the base ring portion of intermediate mandrel 60 also has vertical through ports 65, 66 which communicate respectively with distributor ring ports 52, 53, port 66 thereby feeding die chamber 58, and port 65 communicating with port 67 in the base ring of outer mandrel 61 and therethrough with outer spiral die chamber 59.

The ports 66, 67 admitting to the die chambers may be two in number, and may bisect the respective mandrels in planes normal to those of the land origins, thereby avoiding the pressure pulses that would result from locating of the ports in proximity to such origins.

In accordance with the invention the die chambers 55, 58, 59 open into three concentric internal orifices 68, 69, 70 that merge at a common orifice 71 just below the surface of the outer ring or sleeve 62 and which is defined by the annular gap or opening between said ring 62 and the innermost mandrel 57.

The concentrically nested die head parts, comprising the mandrels and the ring 62, are seen to be fitted, by the shouldered or stepped interfitting of their annular base portions and their interengagement there as by screws of the like concentricity adjusting means 72, 73, 74, for centering adjustment to achieve desired uniformity of gauge of the plastic annularly extruded therefrom.

The apparatus further has a sizing ring 75 which may optionally be employed, and adjusted in concentricity by the screw 76, for final control and adjustment of the back pressure and gauge.

The invention apparatus comprises further an air ring 77, FIG. 1, enclosed at its periphery by a cylindrical, air inletting wall 80, the air ring supported within said wall 80 for rotation by a suitable motor 82, FIG. 1, turning a ring-attached socket 83 through a chain or the like 84.

Pressure air is admitted to the ring 77 through openings in the wall 80 as driven by a blower 85 feeding pipes 86 communicating with said openings.

In the operation of the air ring the air flow is utilized to stabilize the level of the frost line, or point at which the plastic changes from the molten to the solid state, the frost line being desirably kept distinct to assure uniform curing, and also held against moving up, to prevent loss of the biaxial or lengthwise-crosswise orientation or stretching. The bidirectional, or transverse as well as longitudinal, stretching of the plastic is obtained and adjusted by the internal air herein as conventionally supplied to the bubble, as through air pipe 105 and air duct 106 communicating with port 107 in stem 57, FIG. 2. But without careful control of the cooling, supporting and stabilizing external air flow as herein also provided the frost line is susceptible of moving up, as in the event of an increase in ambient temperature.

As a further feature of the invention, the bubble is closed at the top by a pair of moving conveyors 108, 109 which wrap around nip rolls 110, 111 supported on a conventional scaffold 112. Fine adjustment of the nip roll pressure is afforded by conventional means as indicated at 113. At the bottom the belts 108, 109 are carried around rolls 114, 115 carried on shafts journaled in bearings supported in a counter-threaded shaft 116, the rotation of which, as by the wheel 117, affords adjustment of the bubble flatting angle.

Figure 8:
FIG. 8 is a vertical section of the die and adapter assembly of the modified form of the apparatus.

Upon its being flatted between the nip rolls 110, 111 to the form shown at F:T:, FIG. 8, the plastic tube is passed around one or the other of the rolls and thence around guide rolls 118 provided for carrying the flat tubing to a wind-up or supply roll, (not shown). The nip rolls 110, 111, and thereby the conveyor belts 108, 109, are driven or counter-rotated by a motor 119 through belt 120 at a speed producing the desired attenuation or gauge draw-down.

The travel of the conveyors 108, 109 by the nip rolls 110, 111, and with the advance of the plastic tube, is controlled for uniformity of pull of the composite, that is, it is adjusted for removing the plastic very uniformly from the die lips orifice. The use of the travelling endless belts or conveyors 108, 109 for the engaging, closing, and drawing of the tube will be understood as well to eliminate the excessive drag accompanying the use heretofore of stationary closers, or fixed guide plates, which drag has been detrimental particularly to the more exotic materials.

That is, with the moving conveyors of this invention the desired continuous, smooth grab of the plastic, and gradual, smooth converting from a circular to a lay-flat geometry of the tube, is accomplished without the wrinkling heretofore experienced, and with the elimination also of the bulging encountered in the prior art, as a consequence of the necessary gaps or obstructing pockets between the stationary closers and nip rolls, such as heretofore giving rise to a second bulge, or double bubble.

Under this invention, then, the moving conveyor A-frame is an integral part of the nip roll assembly, and the nipping is accomplished by a converging continuous surface which eliminates the previously experienced drag on the film surface thereby avoiding pulsing gauge bands and the like, such as heretofore adversely affecting optical and other film properties. As those skilled in the art are aware, the prior attempts to combat the lineal gauge bands produced by the surging experienced with the conventional stationary plates, by opening the plates to engage the tube further up, were unsuccessful in that this left too little time-distance in which to convert the tube geometry.

As also appreciated by those skilled in the art, films that have a high coefficient of friction, or are extruded at high temperatures giving a high coefficient of friction when in contact with a stationary surface, are impractical to extrude through a blown film apparatus incorporating stationary closers. However the introduction by this invention of a conveyor A-frame moving at the identical line speed of the tube makes blown film extrusion practicable for the combining of a wide variety of such films, or compounds.

It will be understood that the instant method, and the die, air ring, and A-frame apparatus hereof are usable with one or more plies, or with monofilm as well as structured or layered films. In its application to the coextrusion of multi-ply films, the invention method and apparatus has been shown to be uniquely advantageous with reference to the fabricating of composite or dissimilar material films.

As herein before pointed out, the invention provides for the laminating of a multi- (two, three, four, etc.) ply film, from plural (two, three, etc.) dissimilar thermoplastic or plastic resin materials.

In some instances of tri-lamination it may be desired or preferred to employ three, rather then two, dissimilar materials.

In the following example of one such three dissimilar material tri-lamination, there is provided a composite film of four mil overall body and certain properties:
inner layer: 1 mil nylon
core layer : 1 mil Surlyn (DuPont ionomer based upon ethylene) outer layer: 2 mil polyethylene In this example the nylon would supply wanted gas barrier and heat resistance properties; the Surlyn would function as the bonding agent (polyethylene not sealing well directly to nylon); and the outer layer of polyethylene would supply wanted strength and slip characteristics. The overall film would also be characterized by the desired combination of thickness, strength, and stiffness.

In another aspect, the invention contemplates the use for, say, the core or intermediate layer, of scrap material, which has been suitably processed, or reground and flaked, through commercially available equipment. The reconstituted scrap would then be fed into an extruder utilized for the single, say, core, layer of the film structure.

If in a given manufacture the wastage or scrap amounts typically to, say, 5 percent of production, it will be realized that the recovery and reuse in this way of such scrap will result in a somewhat smaller but appreciable saving in manufacturing cost.

Figure 10:
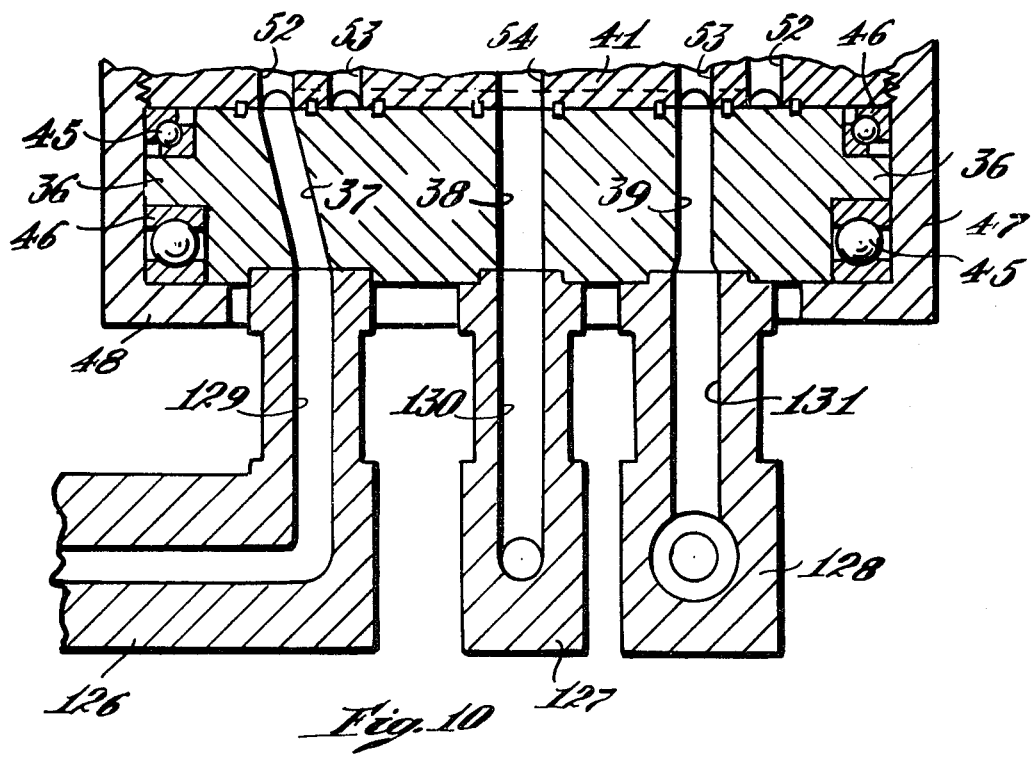
Figure 9:
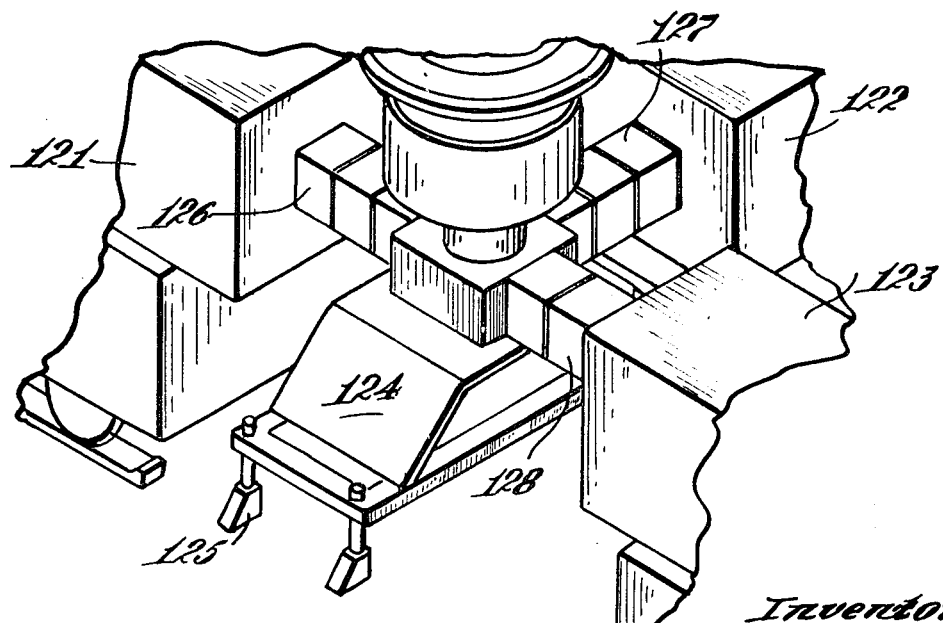

FIGS. 9 and 10 show the invention apparatus, as adapted to such three dissimilar material tri-lamination, to receive first, second and third extruders 121, 122, and 123, which may be wheel mounted for the mentioned purpose of radial engagement and disengagement with the die assembly, comprising a supporting stand 124 which may be leveled on feet 125.

The die stand 124 immediately supports or mounts the three manifolds or adapters 126, 127 and 128, FIG. 10, which are understood to be coupled, in conventional manner and as herein before mentioned, to the extruder nozzles.

The adapters 126, 127 and 128 are each of right angle or elbow construction, as shown, and provided with flow passages or channels 129, 130 and 131 for conducting the molten material from the extruder nozzles to the outer, inner, and intermediate ply forming portions respectively of the die.

More particularly, passage 129 of adapter 126 communicates with outer ply forming passage 37 of die holder 36; passage 130 of adapter 127 communicates with inner ply passage 38 of the die holder; and passage 131 of adapter 128 communicates with die holder passage 39 supplying the intermediate ply forming mandrel of the apparatus.

In fabricating a three dissimilar ply lamination with the just described invention embodiment, then, the third dissimilar material, whether Surlyn, reclaimed scrap, or otherwise, would, if utilized for the intermediate or core ply or layer, be fed to the extruder 123 supplying the manifold or adapter 128, FIGS. 9 and 10.

It will be appreciated that, with the FIGS. 9 and 10 embodiment of the invention, from one to three dissimilar materials may be utilized in the three extruders, and may be laminated in the film in whatever combination or arrangement may be desired or preferred.

It should be understood that the present disclosure is for the purpose of illustration only and that this invention includes all modifications and equivalents falling within the scope of the appended claims.

We claim:

1. A blown tubular die apparatus for extruding laminated film comprising a support body adapted for engagement by a plurality of extruders, a die head completely rotatably mounted on said support body and having therein a plurality of concentric annular chambers and orifices, said support body and die head provided also with passages for conducting molten material from said extruders to said chambers, annular distributing reservoirs formed at the interface between said support body and die head and connecting said support body and die head passages in different positions of annular adjustment of said die head relative to said support body, and means for rotating said die head relative to said support body to obtaining uniform gauge and minimum imperfections in said composite film.

2. In a blown tubular die apparatus for composite film lamination, a die head having a plurality of concentric annular chambers and orifices, a die holder having means for separately connecting said chambers to a plurality of extruders, means for rotating said die head relative to said die holder, an air ring rotatably mounted in desired juxtaposition to said die head, and means for rotating said air ring relative to said die head, whereby to obtain uniform gauge and minimum imperfections in the blown film.

3. A blown tubular die apparatus according to claim 2, wherein said die holder connecting means adapts an intermediate one of said chambers to be connected to one extruder as may be charged with one film material, and inner and outer of said chambers and orifices to be connected to another extruder as may be charged with another film material, whereby without change in the extruder charges multistructured films may be produced by the apparatus with the other material film selectively on the inside or the outside or both sides of the one material film.

4. The apparatus of claim 2, wherein said rotating means is adapted to turn said ring in one and/or the opposite direction.

5. In a blown tubular die apparatus for producing multiply film, a die head having a common internal orifice for extruding the film, means providing a plurality of concentric annular film forming chambers having exit orifices converging to said extrusion orifice, reservoirs communicating with intermediate and outer of said chambers, and die holder means providing bottom feed passages separately connecting each to one of said inner chamber and intermediate and outer reservoirs and to a supply of film material, said die head and holder mounted for rotation relative to one another at a transverse interface therebetween, said feed passages connecting to said reservoirs and inner chamber at said transverse interface whereby each said chamber may be continuously supplied with said film material through said passages and reservoirs subject to said relative rotation of said head and holder of said apparatus.

6. The apparatus of claim 5, and a sizing ring extending said extrusion orifice and whereby to control the back pressure and gauge of the film extruded therethrough.

7. The apparatus of claim 5, and means for sealing said die head reservoirs and die holder passages at said transverse interface of said rotating surfaces.

8. The apparatus of claim 5, and means for rotating said die head relative to said die holder at said transverse interface therebetween.

9. In an apparatus for die forming composite film from thermoplastic material as supplied in molten form from extruders, a common internal orifice for extruding the composite film, means for separately feeding the molten material for each lamination of said composite film, and means forming a plurality of concentric annular homogenizing chambers communicating with said feeding means, said chambers opening and reducing to concentric internal chamber exit orifices, said chamber exit orifices converging at said common film extruding orifice, said chamber forming means comprising a plurality of nested, concentric, close fitting mandrels, said mandrels having annular, juxtaposed, concentric outer and inner faces enclosing and defining said chambers, spiral formations formed on one of the juxtaposed faces of each said chamber, said spiral formations extending in vertical progression from the bottom towards the top of said chambers, and means for centering adjustment of the concentricity of said mandrels, whereby the film material is spirally traveled in and uniformly discharged from said chambers and thereby conditioned therein to eliminate weld marks, to achieve better homogenization, and to minimize gauge deviations.

10. A die forming apparatus according to claim 9, and passage forming adapter means connecting between said apparatus and extruders charged with different film material, said adapter means providing passages between one of said extruders and the inner of said chambers, between other of said extruders and the intermediate of said chambers, and between another of said extruders and the outer of said chambers.

11. The apparatus of claim 9, wherein said spiral formations are double threaded.

12. The apparatus of claim 9, wherein said spiral formations comprise progressively shallower grooves and progressively wider lands.

13. The apparatus of claim 9, wherein said spiral formations define lands and grooves, and wherein said formations are of uniform pitch but in vertical progression of increasingly wider crests in their lands and increasingly shallow depths in their grooves, and wherein also the other of the juxtaposed faces of each said chamber generally parallels the crests of said lands, whereby the molten plastic material in its homogenizing in said chambers is made increasingly to flow over said spiral formations, thereby insuring the avoidance of stagnation of the plastic, and ordering the expelling of it in a smooth tubular film from said chambers.

14. The apparatus of claim 9, wherein said mandrels comprise each a bottom plate portion and an upstanding stem portion.

15. The apparatus of claim 14, wherein said juxtaposed face is of said homogenizing chambers comprise the outer and inner faces of said mandrel stem portions.

16. The apparatus of claim 14, wherein said feeding means comprise ports extending upwardly through said mandrel plate portions.

17. The apparatus of claim 14, wherein said plate portions of said mandrels are nested at interfitting shoulders thereon, and wherein said concentricity adjusting means comprise radially distributed screwsthreaded laterally through said plate portions and engaging said shoulders.

18. In a blown tubular die apparatus for structured film lamination, a die holder having multiple through passages adapted to be connected to multiple extruders; and a die head engaging said die holder and comprising nested concentric spiral mandrels, said spiral mandrels constituting, homogenizing means, homogenizing chambers defined between the inner and intermediate of said mandrels, a ring enclosing and defining a homogenizing chamber with the outer of said mandrels, an internal extrusion orifice formed between said ring and the inner of said mandrels and by convergent exiting from said homogenizing chambers, and distribution passages for connecting between said chambers and said die holder passages.

19. The apparatus of claim 18, and a sizing ring extending said extrusion orifice and whereby to control the back pressure and gauge of the film extruded therethrough.

20. The apparatus of claim 18, and means for adjusting the concentricity of said mandrels.

21. The apparatus of claim 18 wherein said die holder and head engage at a transverse annular interface, and wherein at said interface are provided annular reservoirs communicating between said die holder through passages and said die head distribution passages.

22. In a blown tubular die apparatus for structured film lamination, a die head having an internal extrusion orifice, concentric annular spiral chambers exiting to said orifice, distribution passages to said chambers, and a transverse rotating surface defined by exposed reservoirs communicating with said distribution passages; a die holder having a transverse rotating surface mating with said die head surface, and through passages adapted separately to conduct to said reservoirs and distribution passages as many film supplies as said chambers; and means coupling said die head and holder for relative rotation of, and with said reservoirs and passages in fluid sealed communication at, said mating transverse die head and holder surfaces.

23. The apparatus of claim 22, wherein said passages and reservoirs are fluid sealed by annular seals located at both sides of said reservoirs and in resin tight engagement between said rotating surfaces.

24. The apparatus of claim 22, wherein the radial orientation of said distribution passages is such as to enter said homogenizing chambers remote from the origin of the lands of said spiral chambers.

25. The apparatus of claim 22, wherein said die head is formed with double, radially opposite distribution passages.

26. The apparatus of claim 22, wherein said coupling means comprise means for rotary support of said die head on said die holder.

27. The apparatus of claim 26, wherein said rotary support means comprise ball bearing means.

28. The apparatus of claim 26, wherein said rotary support means comprise radial, opposed ball bearing means on said die holder, and a collar on said die head and enclosing said ball bearing means.

29. The apparatus of claim 22, and means for rotating said die head relative to said die holder at said mating surfaces.

30. The apparatus of claim 29, wherein said rotating means comprise a sprocket fixed on said die head, a motor, and a chain coupling said sprocket and motor.

* * * * *

UNITED STATES PATENT OFFICE
CERTIFICATE OF CORRECTION

Patent No. 3,649,143          Dated March 14, 1972

Inventor(s) Edward G. Papesh, et. al.

Figure 5:
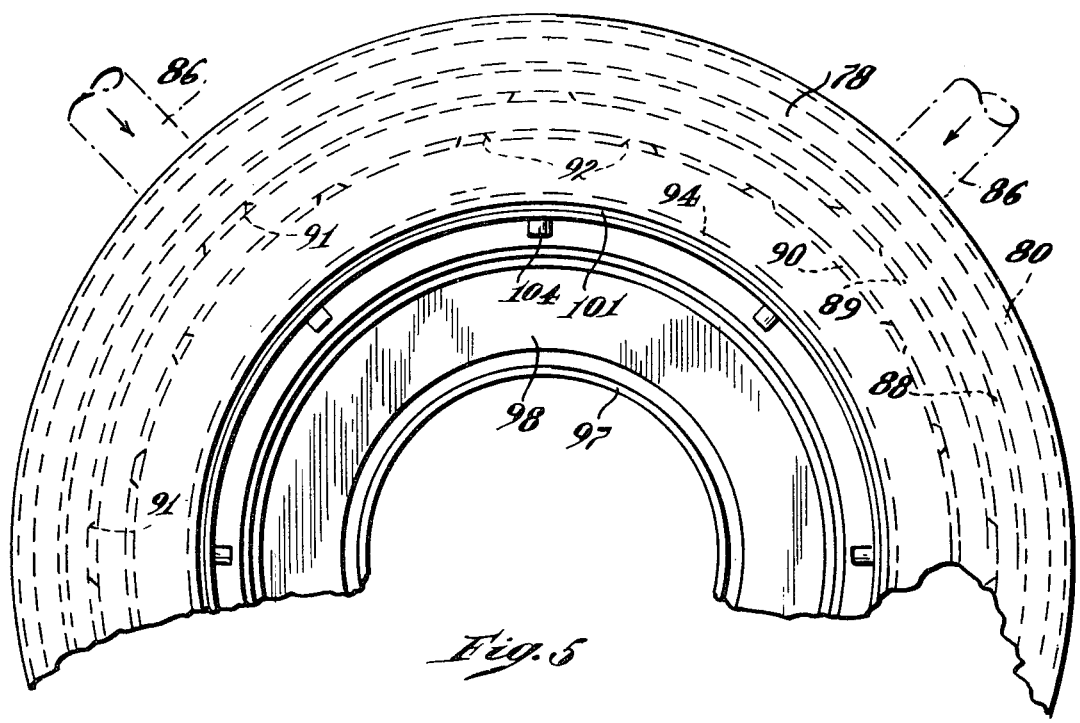
FIG. 5 is a detail view of the film flatting and takeoff means of the invention apparatus.
Figure 6:
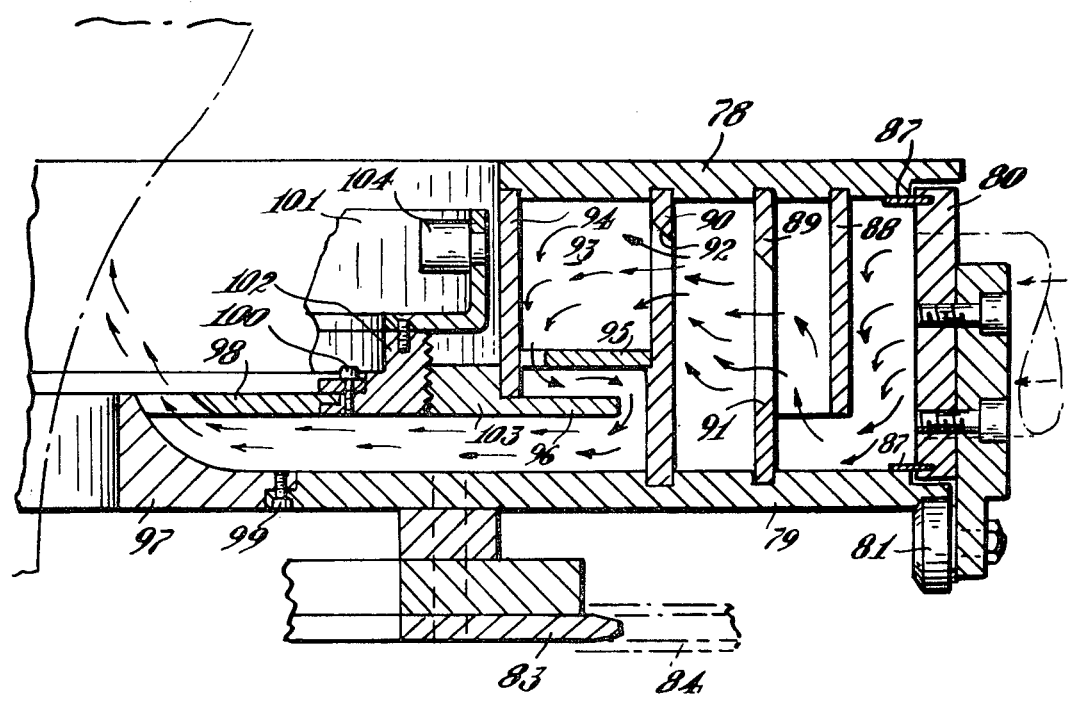
FIG. 6 is a section on the line 8—8 of FIG. 5 showing the flattened tube, as enlarged for illustrating the multilayer structure thereof.
Figure 7:
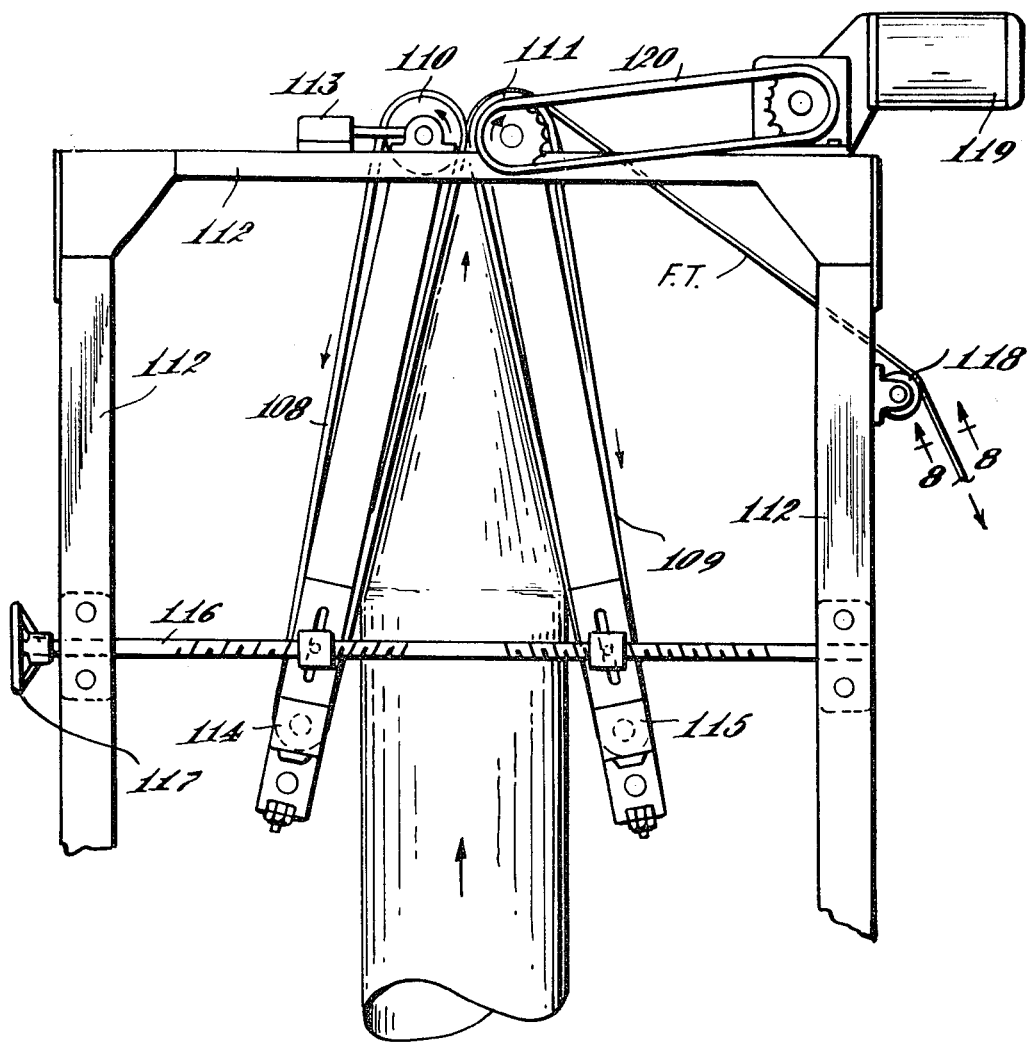
FIG. 7 is a fragmentary isometric view of a modified form of the invention apparatus.

It is certified that error appears in the above-identified patent and that said Letters Patent are hereby corrected as shown below:

In the drawings, cancel Figs. 5 and 6 and renumber Figs. 7, 8, 9 and 10 as Figs. 5, 6, 7 and 8 respectively.

Signed and sealed this 12th day of December 1972.

(SEAL)
Attest:

EDWARD M. FLETCHER, JR.　　　　　　　ROBERT GOTTSCHALK
Attesting Officer　　　　　　　　　　Commissioner of Patents